United States Patent Office 3,282,872
Patented Nov. 1, 1966

3,282,872
POLYADDITION PRODUCTS FROM POLYAMIDES OF POLYBASIC ARALIPHATIC CARBOXYLIC ACIDS
Josef Baltes, Hamburg, and Friedrich Weghorst and Zdzislaw Makus, Hamburg-Harburg, Germany, assignors to Harburger Fettchemie Brinckman & Mergell G.m.b.H., Hamburg-Harburg, Germany, a corporation of Germany
No Drawing. Filed Apr. 25, 1963, Ser. No. 275,525
Claims priority, application Germany, Mar. 18, 1963, H 46,141
9 Claims. (Cl. 260—18)

This invention is concerned with the reaction of polyamides from certain carboxylic acids and organic polyamines with hardenable epoxy compounds and the formation of compositions useable as coatings, laminae interlayers, adhesives, cast and moulded bodies and for packing and casting purposes.

It is known to harden polyamides and epoxy compounds with terminal epoxy groups, i.e. to convert them into an insoluble and infusible condition suitable for many purposes and in particular those mentioned above. These epoxy compounds form infusible and insoluble compositions on reaction with numerous compounds, for example with organic amines and polyamines, with carboxylic acid amides, with aminoplasts, with polycarboxylic acids and acid anhydrides, with thioplasts and phenol resins. The polyamides of polymeric fatty acids are particularly suitable for this purpose. These can, conversely, also be hardened in so far as they contain the appropriate reactive groups, with polyepoxy compounds. Such reactions of polyamides of polymeric fatty acids with epoxy compounds are described more fully in German patent specification No. 972,757. A detailed description of this operation is given by A. M. Paquin in "Epoxy Compounds and Epoxy Resins" Berlin/Gottingen/Heidelberg 1958, Verlag Springer, pages 461–538. Polyamides of the last mentioned type can however be hardened in other ways, for example, with phenol resins, polyisocyanates and acrylic acid esters. However, the combination of polyamides with epoxy compounds has several essential advantages in relation to other systems which concern the handling of the reaction components and the properties of the polyaddition products. These polyamides are non-volatile and non-toxic. Their mixtures with suitable epoxy compounds show after hardening a particularly satisfactory adhesibility, tenacity, flexibility, and impact strength. In so far as electrical properties are concerned, they are particularly advantageous in relation to steam absorption and permeability as well as to inflammability.

It has now been found that polyaddition products can be obtained from epoxy compounds with at least the same properties and indeed improved properties in part in a considerably advantageous manner if polyamides from polybasic araliphatic carboxylic acids and organic polyamines are used in place of polyamides produced from polymeric fatty acids.

According to the present invention there are provided compositions of matter which comprise from 95 to 5% of a polyamide of a polybasic araliphatic carboxylic acid or an amine forming derivative thereof and a polyamine with at least two amino groups and 5 to 95% of a hardenable epoxy compound with terminal epoxy groups. It is preferred to use in the formation of the polyamides mixtures of the polybasic araliphatic polycarboxylic acids with fatty acids, araliphatic monocarboxylic acids, low molecular araliphatic or aromatic dicarboxylic acids. These compositions of matter are used for the manufacture of other products by hardening at normal or higher temperatures, the compositions being used as such or applied to other supporting surfaces.

The manufacture of polybasic araliphatic carboxylic acids, from which are derived the polyamides to be used, is described in the applicants' United States patent application No. 272,873 filed April 15, 1963, entitled Process for the Manufacture of Polybasic Araliphatic Carboxylic Acids and Products Thereof. The manufacture of these polyamides is described in the applicants' United States application No. 272,866 filed April 15, 1963, relating to Polyamides of Polybasic Araliphatic Carboxylic Acids. The entire disclosure of both of the above applications is herein incorporated by reference.

As pointed out in said copending application Serial No. 272,873, there are prepared polybasic araliphatic carboxylic compounds by subjecting the conjugated unsaturated fatty acid compound selected from the class of conjugated unsaturated fatty acids and $C_1$ to $C_4$ alkanol esters of the said acids to ionic copolymerization with an aromatic vinyl compound selected from the class consisting of styrene and homologs of styrene, more particularly, styrene, alpha-methyl styrene and vinyl toluene, in the proportion of 1 mole of fatty acid compound to 0.2 to 5 moles of aromatic vinyl compound and controlling the temperature of the reacting mass to prevent the mass temperature from exceeding at any time a temperature of about 200° C., subsequently removing volatile products of the reaction by distilling the mass at atmospheric pressure, and recovering the product. As pointed out in said copending application Serial No. 272,866, the polyamines employed to make the polyamides have 2 to 5 amino groups.

The polyamides to be used are soluble thermoplastic resin-like condensation products of polybasic araliphatic carboxylic acids with preferably aliphatic polyamines, ranging from a balsam-like character to glass-hard. The hardenable epoxy compounds are preferably diglycidethers with terminal epoxy groups obtained by reaction of materials containing or forming terminal epoxy groups with for example polyvalent phenols. Polyepoxides obtained by epoxydation of multiple unsaturated compounds can also be used. These hardenable epoxy compounds may also contain other reactive groups, for example, hydroxy groups. They are soluble, thermoplastic and may be balsam-like to resinous. Monoepoxy compounds which are approachable in the same manner can be used therewith.

Polyamides can be used which contain free primary and/or secondary amino-groups or free carboxyl groups or both types of groups. The preferred polyamides with free primary and/or secondary groups are those which have an amine number of between 20 and 350. They react with polyepoxide compounds even at normal temperature, more rapidly at elevated temperature with spatial cross-linking and formation of infusible more or less insoluble material. Polyamides with free carboxylic groups are sluggishly reactive and require higher hardening temperatures, about 100° C. and above, and longer hardening times. The products according to the invention result from mixtures of 5 to 95 parts by weight of the described polyamide and 5 to 95 parts by weight of the epoxy compound at normal or elevated temperature. The proportion of components is not critical, since any portions of the one or other reactant components which do not react do not adversely affect the possible uses of the product in accordance with the invention, and indeed, their presence is often desirable. The components can also be mixed in the form of their solutions in suitable solvents or solvent mixtures which belong to the group of alcohols, aromatic hydrocarbons, halogenated hydrocarbons and ketones and remain after evaporation of the solvent as infusible and more or less insoluble masses. The properties of the products in accordance with the invention can be varied within exceedingly wide limits.

They vary according to the reaction components and the proportions of said components in the mixture.

The araliphatic polycarboxylic acids on which the polyamides are based are obtained by cationic copolymerisation of conjugated unsaturated fatty acids, which contain compounds or mixtures with other fatty acids or compounds and aromatic vinyl compounds, the proportions of the latter being within the limits of 0.5 to 5 mols per mol of conjugated unsaturated fatty acid. According to the type and proportions of the reaction components the similar types of products obtained have structural differences with different properties which they impart to the polyamide obtained therefrom. While in the manufacture of polyamides from polymeric fatty acids only relatively small proportions of monomeric fatty acids can be taken up, since otherwise non-homogeneous products which are not compatible with epoxy compounds would be obtained, when using araliphatic polycarboxylic acids with considerable portions of monocarboxylic acids, such as fatty acids, or araliphatic monocarboxylic acids, completely homogenous polyamides are obtained which are exceptionally compatible with epoxy compounds and give homogenous polyaddition products. These essential advantages which arise probably from the presence of aromatic groups accordingly permit not only a further widening of the assorted types dependent on the kind and quantity of the monocarboxylic acids used, but also contribute decisively to the cheapness of the said polyamides, since for example the monocarboxylic acid contained in the copolymerizate for the manufacture of the polyamide can be used completely or to a large extent. In order to elucidate this by comparative statistics reference is made to the fact that in the polymerisation of unsaturated fatty acid mixtures, as for example the usually employed soya fatty acids, tall oil fatty acids, or linseed oil fatty acids, at best only about 60% of suitable polymeric fatty acids were obtained for the manufacture of the polyamides in question, while the residue consisted of a difficultly useable mixture of oleic acid and saturated acids which could only be separated with considerable difficulty. In contrast for the manufacture of the now described polyamides the starting materials employed are consumed up to 100%.

In addition to the said monocarboxylic acids, low molecular aliphatic and aromatic dicarboxylic acids, for example adipic acid, sebacic acid, phthalic acid, and terephthalic acid can also be used in forming the polyamides. According to their proportions such polyamides show higher melting points and a stronger polarity.

The polyamines preferred for forming the polyamides are those of an aliphatic nature having at least two amino groups, for example, ethylene diamine, diethylenetriamine, triethylenetetramine, hexamethylenediamine and tetraethylpentamine. Aromatic diamines for example phenylenediamine and diaminodiphenylmethane can also be utilized, preferably in admixture with the said aliphatc polyamines.

The described polyamides are more compatible with epoxy compounds than the corresponding polyamides of polymeric fatty acids. Thus for example, the liquid types are readily miscible in any proportion at normal temperature with liquid diglycidethers, obtained by alkaline condensation of diphenylolpropane with epichlorhydrin, while in the case of the corresponding polyamides from polymeric fatty acids homogeneous mixtures were only obtained at 40° C. or still higher temperatures. With reference to the temperature dependence of the polyaddition this effect leads not only to favorable pot times of the mixture in accordance with the invention, but the formation of non-homogeneous polyaddition products, as can occur readily with the use of other reaction components, is safely avoided. The ready compatibility of the present polyamides with numerous other substances is conveyed also to mixtures with epoxy compounds so that for example phenolic resins, aminoplasts, polyvinyl chloride, polyvinylidene chloride, thermoplastic polyurethane, and certain synthetic elastomers in any proportion, others such as sulphur dioxide extracts of mineral oils, certain types of bitumen, coal tar, asphalt, polystyrene, polyethylene, and polypropylene in limited proportions, can be homogeneously dispersed and thus after termination of the polyaddition remain homogeneously dispersed.

The mixture in accordance with the invention can be combined before hardening with various filling materials and pigments in an amount up to ten times that of the original mixture. It is to be preferred that the filling materials should not react with the reactive components of the mixture and in the first place should be substantially water free. Customary filling materials which may be mentioned are metal powders, heavy metal oxides, stone powder, glass powder and glass fibres, chalk and quartz dust.

The mixtures according to the invention after hardening have unusually advantageous properties. In particular they have extremely high adhesibility, flexibility, resistance to compression and tensile strength, resistance to shock and stability of shape, limited shrinkability and good stability to heat and cold. They have an extremely small capacity for absorbing water and are not attacked, or substantially not attacked, by chemicals including acids, lyes and numerous solvents. Their electrical properties are characterized by a high tracking resistance and strain resistance, high specific volume resistance and excellent dielectric behavior. Optimal properties occur in general with stoichiometric mixture proportions of the reaction components.

The fields of use of the products in accordance with the invention result from the characterising properties. They can be used as two-component lacquers either undiluted or in the form of solutions and give on any substrate after hardening at normal or higher temperatures firmly adhesive, highly polished, flexible and resistant coatings. They are also adapted as clear lacquers and pigmented lacquers for the coating of otherwise difficultly handlable materials, for example for the lacquering of artificial films or for the coating of rough cemented or plastered surfaces. They find a wide possibility of use as self-hardening adhesives for the corrosion resistant impact-insensitive combination of different types of materials. Aluminum, steel and other metals as well as glass, wood, leather, artificial materials and ceramic materials can be firmly and durably adhered. They can be used as packing, casting and primer compositions, preferably in combination with filling materials of all kinds, for weather and chemically resistant coating of joints and hollow spaces and for the smoothing of uneven surfaces, the firm union with the base during hardening being particularly advantageous in this use. It is also possible in accordance with the invention to produce mixtures for case and moulded bodies, which have highly polished outer surfaces and despite their considerable hardness are insensitive to impact and shock. Because of their good electrical properties they can be used for the embedding of current carrying structural parts.

*Example I*

An isomerized methyl ester of soya oil fatty acids with a content of 56% conjugated unsaturated fatty acid methyl ester was cationically copolymerized in known manner with styrene in the proportion of one mol of styrene to one of the conjugated ester. After removal by distillation at 2 mm. and 280° C. of the volatile portion there remained a residue consisting essentially of an araliphatic dicarboxylic acid methyl ester having a pale yellow color in a yield of 60%.

Twenty-six kg. of this araliphatic polycarboxylic acid methyl ester and 7.5 kg. of diethylene triamine (about 95%) were condensed while distilling off the methanol set free. The resulting clearly transparent polyamide of bright yellow color had an amino number of 260 and a viscosity of 36 poises at 60° C.

This polyamide was reacted with an epoxy compound, which was produced by alkaline condensation of epichlorhydrin and diphenylolpropane and had the following properties: liquid at normal temperature, two epoxy groups per molecule, 0.3 hydroxy groups per molecule, molecular weight about 380.

Mixtures in various proportions produced at 40° C. were immediately homogeneous, on mixing the reaction components at 20° C. clear solutions resulted within at the most 20 minutes. The compositions of the mixtures produced in individual cases and their properties as well as the nature of the corresponding polyaddition products can be seen from the accompanying Table 1.

24 kg. of the total copolymerizate and 7.6 kg. of diethylene triamine (about 95%) were condensed with distillation of the methanol set free. There remained a thinly liquid pale yellow polyamide with the amine number 268 and a viscosity of 2 poises at 60° C.

A mixture of 52 parts by weight of this polyamide and 48 parts by weight of the epoxy compound specified in Example I were applied as a layer of ½ mm. thickness to a strip of metal sheet and this then covered on the coating side with a further strip of metal sheet. The specimen sheets stored at normal temperature were firmly

TABLE 1

| Parts by Weight | | Commencement of gelatinization at— | | Adhesion free at— | | Mechanical Properties |
|---|---|---|---|---|---|---|
| Polyamide | Epoxy Compound | 20° C. (after mins.) | 70° C. (after mins.) | 20° C. (mins.) | 70° C. (mins.) | |
| 80 | 20 | 480 | 36 | 1,200 | ca. 100 | Very flexible, tenacious. |
| 60 | 40 | 90 | 33 | 330 | 100 | Flexible. |
| 44 | 56 | 160 | 27 | 240 | 33 | Hard, shockproof. |
| 40 | 60 | 150 | 33 | 480 | 38 | Hard. |
| 20 | 4 | 480 | 30 | 1,200 | 100 | Glasshard, brittle. |

All resins were completely homogeneous and clearly transparent. The highest impact resistance was obtained with the product formed from 44 parts by weight of polyamide and 56 parts by weight of the epoxy compound (in stoichiometric proportion).

Similar polyaddition products were obtained from polyamides which were produced corresponding to this example from wood oil fatty acid methyl ester, dehydrated castor oil fatty acids, isomerized sunflower oil fatty acids, isomerized cotton seed oil fatty acids, isomerized safflower oil fatty acids methyl ester and isomerized tall oil fatty acids methyl ester.

*Example II*

Isomerized soya oil fatty acids with a content of 56% conjugated-unsaturated fatty acid was copolymerised with styrene in the proportions of 1 mol of styrene per mol of conjugated ester. The volatile portion was removed by distillation at 2 mm. and 280° C. to give a yield of 80% of a residue of pale yellow color. 25 kg. of the mixture so obtained from araliphatic polycarboxylic acid and monocarboxylic acid was condensed with 7.6 kg. of diethylene triamine (about 95%) the water set free being removed by distillation. The resulting polyamide had an amine number of 264 and a viscosity of 6 poises at 60° C.

55 parts of this polyamide and 45 parts of the epoxy compound obtained in Example I were mixed together and poured out onto a hot metal at 100° C. The homogeneous mixture at first liquid solidified within 2 minutes to a hard infusible mass firmly adherent to the support.

*Example III*

Isomerised soya oil fatty acid methyl ester with a content of 56% conjugated unsaturated fatty acid methyl ester was cationically copolymerized with a mixture of styrene and alpha-methyl styrene (1:1) in the proportion of 1 mol of aromatic vinyl compound per mol of conjugated unsaturated fatty acid methyl ester.

adherent to one another after 5 hours. The adhesive layer was highly elastic and resistant to numerous flexing tests. At 70° C. the hardening of the corresponding adhesive layer took about one half hour and at a 100° C. hardening set in within 2 minutes. Thus under these conditions an extremely firm adhesion of the metal strips was attained.

The outsanding stability of this type of adhesion at low temperatures was particularly noteworthy. Specimens stored at 40° C. for several days showed a similar resistance to flexing experiments at the same temperature as at normal temperature.

*Example IV*

Isomerized soya oil fatty acid methyl ester with a content of 56% conjugated unsaturated fatty acid methyl ester was cationically copolymerized with styrene in varying proportions. The volatile portion was removed by distillation at 2 mm. and 280° C. Individual specimens of the so obtained polycarboxylic acid methyl ester were condensed with diethylene triamine (about 95%) with removal by distillation of the methanol set free. The resulting polyamide served for hardening experiments with the epoxy compound described in Example I, stoichiometrical proportions of the reaction components being used in the mixture. The details of the structure of the polycarboxylic acid ester and the polyamide obtained therefrom as well as the properties of the hardened product are given in Table 2.

TABLE 2

| Mol. Styrene Mol Conjuene | Parts by weight diethylenetriamine per part by weight of copolymerizate | Amino No. of the polyamide | Parts by weight, polyamide per 100 parts by weight epoxide | Commencement of gelatinization | | Adhesive free at— | |
|---|---|---|---|---|---|---|---|
| | | | | 20° C. (mins.) | 70° C. (mins.) | 20° C. (mins.) | 70° C. (mins.) |
| ½ | 0.34 | 290 | 96 | 60 | 27.5 | 210 | 33 |
| 1 | 0.29 | 260 | 108 | 60 | 27.5 | 240 | 33 |
| 2 | 0.26 | 242 | 116 | 180 | 33.5 | 300 | 38 |
| 4 | 0.19 | 174 | 162 | 210 | 34 | 330 | 42 |

*Example V*

95 parts by weight of the polyamide described in Example I, 4.5 parts by weight of the epoxy compound specified in Example I and 0.5 part by weight of styrene monoxide were mixed together and applied to a paper strip. At 70° C. there had formed within 25 minutes a tenacious but highly flexible mass which had a polished surface and proved very resistant to the influence of hot water, lyes, and dilute acids.

Example VI

From isomerized sunflower oil fatty acid methyl ester (62% conjugated unsaturated component) and styrene in the proportion of 1 mol of styrene per mol of conjugated unsaturated fatty acid methyl ester, a polycarboxylic acid methyl ester was produced by the method of Example I. The yield in this case amounted to 64%.

720 grams of this ester and 125 grams of ethylene diamine were condensed methanol set free being distilled off, a polyamide resulting with amine number 98.

50 grams of this polyamide and 70 grams of an epoxy compound obtained by alkaline condensation of epichlorhydrin and diphenylolpropane (softening point 70° C., 1.8 epoxy groups per molecule, 2.8 hydroxy groups per molecule) were melted together and hardened in 2 hours in an oven at 120° C. An infusible and completely insoluble mass was formed which was tenacious and extremely shockproof.

Example VII 50 parts by weight of the polyamide described in Example VI was dissolved in 50 parts by weight of xylol/propanol (1:1) mixture and mixed with 66 parts by weight of a solution consisting of 33 parts by weight of the epoxy compound specified in Example VI, 23.1 parts by weight of ethylene glycol, 3.3 parts by weight of butylene glycol and 6.6 parts by weight of a high boiling aromatic hydrocarbon (xylol) and higher homologues. Strips of wood were coated with this mixture and after 8 hours there had formed on the wood an adhesive-free, highly polished and firmly adhesive lacquer film.

The residue of the mixture kept at normal temperature began to gel after about 24 hours.

Example VIII

For the manufacture of a primer composition 50 parts by weight of the polyamide used in Example III, were mixed with 80 parts by weight of iron oxide and separately therefrom 50 parts by weight of the epoxy compound used in the same example was intimately mixed with 40 parts by weight of kaolin, the two mixtures combined and worked up to a homogeneous mass. This was then spread on a pickled dry steel sheet and hardened within 8 hours to a flexible, shockproof and impact resistant coating. The primer composition hardened within a few minutes after the application of the flame of a blow lamp or the rays of an infra-red lamp.

We claim:

1. A composition of matter comprising 5–95% of a hardenable epoxy compound having terminal epoxy groups and from 95–5% of a polyamide prepared by a process which comprises condensing a polyamine having 2 to 5 amino groups with a polybasic araliphatic carboxylic compound, said compound having been prepared by subjecting a conjugated unsaturated fatty acid compound selected from the class consisting of conjugated unsaturated fatty acids and $C_1$ to $C_4$ alkanol esters of said acids to ionic copolymerization with an aromatic vinyl compound selected from the class consisting of styrene, alpha-methyl styrene and vinyl toluene in the proportion of 1 mole of fatty acid compound to 0.2 to 5 moles of aromatic vinyl compound and controlling the temperature of the reacting mass to prevent the mass temperature from exceeding at any time a temperature of about 200° C., said polyamide forming process comprising controlling the mass temperature throughout the course of the resulting reaction to maintain the temperature within the range of 120 to 230° C.

2. A composition of matter in accordance with claim 1 wherein the polybasic araliphatic carboxylic acid used to form the polyamide is mixed with fatty acids and low molecular aliphatic acids.

3. A composition of matter in accordance with claim 1 wherein the polybasic araliphatic carboxylic acid used to form the polyamide is mixed with fatty acids and araliphatic monocarboxylic acids.

4. A composition of matter in accordance with claim 1 wherein the polybasic araliphatic carboxylic acid used to form the polyamide is mixed with fatty acids and aromatic dicarboxylic acids.

5. A composition of matter in accordance with claim 1 wherein the polyamine used to form the polyamide contains free primary amino groups and has an amine number between 20 and 350.

6. A composition of matter in accordance with claim 1 wherein the polyamine used to form the polyamide contains free secondary amino groups and has an amine number between 20 and 350.

7. The hardened composition obtained by heating the composition of claim 1 to a temperature of about between 100 and 120° C.

8. A composition according to claim 1 wherein the aromatic vinyl chloride is styrene.

9. The composition according to claim 8 wherein the hardenable epoxy compound is a condensation product of diphenylolpropane with epichlorhydrin.

References Cited by the Examiner

UNITED STATES PATENTS

| | | | |
|---|---|---|---|
| 2,563,870 | 8/1951 | Rust et al. | 260—23 |
| 2,589,655 | 3/1952 | Armitage et al. | 260—407 |
| 2,655,488 | 10/1953 | Kanning et al. | 260—23 |
| 2,952,648 | 9/1960 | Swann et al. | 260—23 |
| 2,990,387 | 6/1961 | Bobalek et al. | 260—23 |
| 3,162,658 | 12/1964 | Baltes et al. | 260—405.6 |

FOREIGN PATENTS 1,058,730  12/1959  Germany.

LEON J. BERCOVITZ, *Primary Examiner.*

R. W. GRIFFIN, *Assistant Examiner.*